US012512093B2

(12) United States Patent
Busch et al.

(10) Patent No.: US 12,512,093 B2
(45) Date of Patent: Dec. 30, 2025

(54) SENSOR-PROCESSING SYSTEMS INCLUDING NEUROMORPHIC PROCESSING MODULES AND METHODS THEREOF

(71) Applicant: SYNTIANT, Aliso Viejo, CA (US)

(72) Inventors: Kurt F. Busch, Laguna Hills, CA (US); Jeremiah H. Holleman, III, Davidson, NC (US); Pieter Vorenkamp, Laguna Beach, CA (US); Stephen W. Bailey, Irvine, CA (US); David Christopher Garrett, Tustin, CA (US)

(73) Assignee: SYNTIANT, Irvine, CA (US)

( * ) Notice: Subject to any disclaimer, the term of this patent is extended or adjusted under 35 U.S.C. 154(b) by 772 days.

(21) Appl. No.: 16/529,456

(22) Filed: Aug. 1, 2019

(65) Prior Publication Data

US 2020/0043477 A1 Feb. 6, 2020

Related U.S. Application Data

(60) Provisional application No. 62/713,423, filed on Aug. 1, 2018.

(51) Int. Cl.
*G10L 15/16* (2006.01)
*G06N 3/08* (2023.01)
(Continued)

(52) U.S. Cl.
CPC ............... *G10L 15/16* (2013.01); *G06N 3/08* (2013.01); *G10L 15/02* (2013.01); *G10L 15/22* (2013.01); *G10L 2015/088* (2013.01)

(58) Field of Classification Search
CPC . G06N 3/00; G06N 3/08; G10L 15/00; G10L 15/02; G10L 15/16; G10L 15/22; G10L 2015/088
See application file for complete search history.

(56) References Cited

U.S. PATENT DOCUMENTS 9,478,231 B1 * 10/2016 Soman ................. G06F 1/3206
9,953,634 B1    4/2018 Pearce et al.
(Continued)

OTHER PUBLICATIONS

Price, M., Glass, J. and Chandrakasan, A.P., 2017. A low-power speech recognizer and voice activity detector using deep neural networks. IEEE Journal of Solid-State Circuits, 53(1), pp. 66-75. (Year: 2017).*

(Continued)

*Primary Examiner* — Daniel C Washburn
*Assistant Examiner* — Sean E Serraguard
(74) *Attorney, Agent, or Firm* — Rutan & Tucker LLP; Hani Z. Sayed; Ravi Mohan

(57) ABSTRACT

Disclosed is a sensor-processing system including, in some embodiments, a sensor, one or more sample pre-processing modules, one or more sample-processing modules, one or more neuromorphic integrated circuits ("ICs"), and a microcontroller. The one or more sample pre-processing modules are configured to process raw sensor data for use in the sensor-processing system. The one or more sample-processing modules are configured to process pre-processed sensor data including extracting features from the pre-processed sensor data. Each of the neuromorphic ICs includes at least one neural network configured to arrive at actionable decisions of the neural network from the features extracted from the pre-processed sensor data. The microcontroller includes a CPU along with memory including instructions for operating the sensor-processing system. In some embodiments, the sensor is a pulse-density modulation ("PDM") microphone, and the sensor-processing system is configured for keyword spotting. Also disclosed are methods of such a keyword spotting sensor-processing system.

9 Claims, 12 Drawing Sheets

(51) Int. Cl.
*G10L 15/02* (2006.01)
*G10L 15/08* (2006.01)
*G10L 15/22* (2006.01)

(56) References Cited

U.S. PATENT DOCUMENTS

| | | | |
|---|---|---|---|
| 2014/0089232 A1* | 3/2014 | Buibas | G06N 3/08 |
| | | | 706/11 |
| 2014/0244273 A1 | 8/2014 | Laroche et al. | |
| 2015/0066498 A1* | 3/2015 | Ma | G06F 1/325 |
| | | | 704/233 |
| 2015/0269954 A1* | 9/2015 | Ryan | G10L 15/28 |
| | | | 704/233 |
| 2016/0196838 A1 | 7/2016 | Rossum et al. | |
| 2016/0351197 A1* | 12/2016 | Tan | G10L 17/02 |
| 2017/0229117 A1* | 8/2017 | van der Made | G06F 3/167 |
| 2017/0236051 A1* | 8/2017 | van der Made | G06N 3/088 |
| | | | 706/27 |
| 2018/0039768 A1* | 2/2018 | Roberts | G10L 17/24 |
| 2018/0276537 A1* | 9/2018 | Wood | G06N 3/0635 |
| 2018/0315416 A1* | 11/2018 | Berthelsen | G10L 15/005 |
| 2019/0013037 A1* | 1/2019 | Haiut | G06N 3/0481 |
| 2019/0042910 A1* | 2/2019 | Krishnamurthy | G06N 3/049 |
| 2019/0333522 A1* | 10/2019 | Lesso | G10L 17/06 |
| 2020/0035233 A1* | 1/2020 | Lee | G10L 25/84 |
| 2021/0304734 A1* | 9/2021 | Kang | G10L 15/063 |

OTHER PUBLICATIONS

International Search Report and Written Opinion, PCT Application No. PCT/US19/44713, mailed Oct. 25, 2019.
Supplementary Partial European Search Report issued in corresponding EP Application No. 19844888.8, dated Aug. 23, 2022.

* cited by examiner $$\begin{bmatrix} y_0 \\ \vdots \\ y_{N-1} \end{bmatrix} = \text{ReLU} \left( \begin{bmatrix} w_{00} & \cdots & w_{0,M-1} \\ \vdots & \cdots & \vdots \\ w_{N-1,0} & \cdots & w_{N-1,M-1} \end{bmatrix} \begin{bmatrix} x_0 \\ \vdots \\ x_{M-1} \end{bmatrix} + \begin{bmatrix} b_0 \\ \vdots \\ b_{N-1} \end{bmatrix} \right)$$

FIG. 11

SENSOR-PROCESSING SYSTEMS INCLUDING NEUROMORPHIC PROCESSING MODULES AND METHODS THEREOF

PRIORITY

This application claims the benefit of priority to U.S. Provisional Patent Application No. 62/713,423, filed Aug. 1, 2018, titled "Sensor-Processing Systems Including Neuromorphic Integrated Circuits And Methods Thereof," which is hereby incorporated by reference into this application in its entirety.

BACKGROUND

Conventional central processing units ("CPUs") process instructions based on "clocked time." Specifically, CPUs operate such that information is transmitted at regular time intervals. Based on complementary metal-oxide-semiconductor ("CMOS") technology, silicon-based CPUs can be manufactured with more than 5 billion transistors per die including features as small as 10 nm. Advances in CMOS technology have been parlayed into advances in parallel computing, which is used ubiquitously in mobile computers and personal computers containing multiple CPUs, or cores of a CPU.

Machine learning is a subsection of computer science directed to providing machines the ability to learn from data and, for example, make predictions on the data. One branch of machine learning includes deep learning, which is directed at utilizing deep, or multilayered, neural networks. Machine learning is becoming commonplace for numerous applications including bioinformatics, computer vision, video games, marketing, medical diagnostics, online search engines, and the like, but traditional CPUs are often not able to supply a sufficient amount of processing capability while keeping power consumption low.

SUMMARY

Disclosed herein are sensor-processing systems including neuromorphic integrated circuits and methods thereof.

Disclosed herein is a sensor-processing system including, in some embodiments, a sensor, one or more sample pre-processing modules, one or more sample-processing modules, one or more neuromorphic ICs, and a microcontroller. The one or more sample pre-processing modules are configured to process raw sensor data for use in the sensor-processing system. The one or more sample-processing modules are configured to process pre-processed sensor data including extracting features from the pre-processed sensor data. Each neuromorphic IC of the one or more neuromorphic ICs includes at least one neural network configured to arrive at actionable decisions of the neural network from the features extracted from the pre-processed sensor data. The microcontroller includes at least one CPU along with memory including instructions for operating the sensor-processing system.

In some embodiments, the sensor-processing system further includes a sample holding tank configured to at least temporarily store pre-processed sensor data for subsequent or repeated use in the sensor-processing system.

In some embodiments, the sensor-processing system further includes a feature store configured to at least temporarily store the features extracted from the pre-processed sensor data for the one or more neuromorphic ICs.

In some embodiments, the sensor-processing system includes a single neuromorphic IC including a single neural network configured as a classifier.

In some embodiments, the sensor-processing system includes at least a first neuromorphic IC including a relatively larger, primary neural network and a second neuromorphic IC including a relatively smaller, secondary neural network. The primary neural network is configured to power on and operate on the features extracted from the pre-processed sensor data after the secondary neural network arrives at an actionable decision on the features extracted from the pre-processed sensor data, thereby lowering power consumption of the sensor-processing multi-chip.

In some embodiments, the sensor is an analog or digital microphone, an accelerometer, a gyroscope, a magnetometer, a tilt sensor, a temperature sensor, a humidity sensor, a barometer, a proximity sensor, a light sensor, an infrared sensor, a color sensor, a pressure sensor, a touch sensor, a flow sensor, a level sensor, an ultrasonic sensor, a smoke sensor, a gas sensor, an alcohol sensor, or a combination thereof.

In some embodiments, the sensor is a pulse-density modulation ("PDM") microphone, the one or more sample pre-processing modules include a PDM decimation module, and the one or more sample-processing modules include a time domain-processing module and a frequency domain-processing module. The PDM decimation module is configured to decimate audio samples from the PDM microphone to a baseband audio sampling rate for use in the sensor-processing system. The time domain-processing module and the frequency domain-processing module are configured to extract features from decimated audio samples.

In some embodiments, the sensor-processing system is configured as a keyword spotter. The features extracted from the decimated audio samples are one or more signals in a time domain, a frequency domain, or both the time and frequency domains characteristic of keywords the one or more neural networks are trained to recognize.

Also disclosed herein is a method of conditional neural network operation in a sensor-processing system upon detection of a credible signal including, in some embodiments, operating a PDM microphone, a PDM decimation module, a time domain-processing module, and a frequency domain-processing module; powering on the neural network if one or more signals are present in an audio sample; and operating the neural network to determine if the one or more signals includes a keyword. Operating the time domain-processing module and the frequency domain-processing module includes identifying the one or more signals of the audio sample in a time domain or a frequency domain if the one or more signals are present.

In some embodiments, the method further includes pulling the audio sample from a sample holding tank to confirm the one or more signals includes a keyword. Alternatively, the method further includes pulling the audio sample from the sample holding tank to process the audio sample differently.

Also disclosed herein is a method of conditional neural network operation in a sensor-processing system upon detection of a credible keyword including, in some embodiments, operating a PDM microphone, a PDM decimation module, a time domain-processing module, and a frequency domain-processing module; powering on and operating a smaller and/or lower-powered secondary neural network if one or more signals are present in an audio sample to determine if the one or more signals includes a keyword; and powering on and operating a larger, higher-powered primary neural network if the one or more signals include a keyword to confirm the one or more signals includes the keyword. Operating the time domain-processing module and the frequency domain-processing module includes identifying the one or more signals of the audio sample in a time domain or a frequency domain if the one or more signals are present.

In some embodiments, the method further includes pulling the audio sample from a sample holding tank to confirm the one or more signals includes a keyword. Alternatively, the method further includes pulling the audio sample from the sample holding tank to process the audio sample differently.

Also disclosed herein is a method of intervallically operating a neural network of a sensor-processing system including, in some embodiments, operating a PDM microphone, a PDM decimation module, a time domain-processing module, and a frequency domain-processing module; powering on and operating the neural network every $n^{th}$ frame of the audio sample to determine if one or more signals of an audio sample are present and if the one or more signals includes a keyword. Operating the time domain-processing module and the frequency domain-processing module includes identifying the one or more signals of the audio sample in a time domain or a frequency domain if the one or more signals are present.

In some embodiments, the method further includes operating the neural network as frequently as every frame if the one or more signals includes a keyword. Operating the neural network as frequently as every frame captures any subsequent keywords with better resolution.

In some embodiments, the method further includes pulling the audio sample from a sample holding tank to confirm the one or more signals includes a keyword. Alternatively, the method further includes pulling the audio sample from the sample holding tank to process the audio sample differently.

Also disclosed herein is a method of microphone-mode switching for a sensor-processing system including, in some embodiments, operating a PDM microphone in a lower-frequency mode to conserve power; operating a time domain-processing module and a frequency domain-processing module including i) extracting features from an audio sample and ii) determining if one or more signals are present in a time domain or a frequency domain; operating the PDM microphone in a higher-frequency mode for better signal-to-noise ration if the one or more signals are present; and operating a PDM decimation module in accordance with either the lower-frequency mode or the higher-frequency mode to format the audio sample for use in a sensor-processing system.

In some embodiments, the method further includes powering on and operating a neural network to determine if the features extracted from the audio sample include one or more keywords.

In some embodiments, the method further includes pulling the audio sample from a sample holding tank to confirm the features extracted from the audio sample include one or more keywords. Alternatively, the method further includes pulling the audio sample from the sample holding tank to process the audio sample differently.

Also disclosed herein is a method of speaker identification for a sensor-processing system including, in some embodiments, operating a PDM microphone, a PDM decimation module, a time domain-processing module, and a frequency domain-processing module; and powering on and operating a neural network to determine if one or more features extracted from an audio sample are characteristic of an assigned speaker. The time domain-processing module and the frequency domain-processing module are configured for extracting the one or more features from the audio sample. The sensor-processing system is configured to continue extracting features from audio samples and operating the neural network to identify keywords if a speaker is identified as the assigned speaker.

Also disclosed herein is a method for a sample holding tank of a sensor-processing system including, in some embodiments, operating a PDM microphone and a PDM decimation module to format an audio sample for use in the sensor-processing system; sending the audio sample to both the holding tank and one or more sample-processing modules; operating a time domain-processing module and a frequency domain-processing module to extract features from the audio sample; operating a neural network to determine if the features extracted from the audio sample include one or more keywords; and pulling the audio sample from the sample holding tank and sending the audio sample to the one or more sample-processing modules for additional but different sample processing to confirm the features extracted from the audio sample include the one or more keywords.

These and other features of the concepts provided herein will become more apparent to those of skill in the art in view of the accompanying drawings and following description, which disclose particular embodiments of such concepts in greater detail.

DRAWINGS

FIG. 11 illustrates an m×n matrix for a neural network in accordance with some embodiments.

DESCRIPTION

Figure 1:
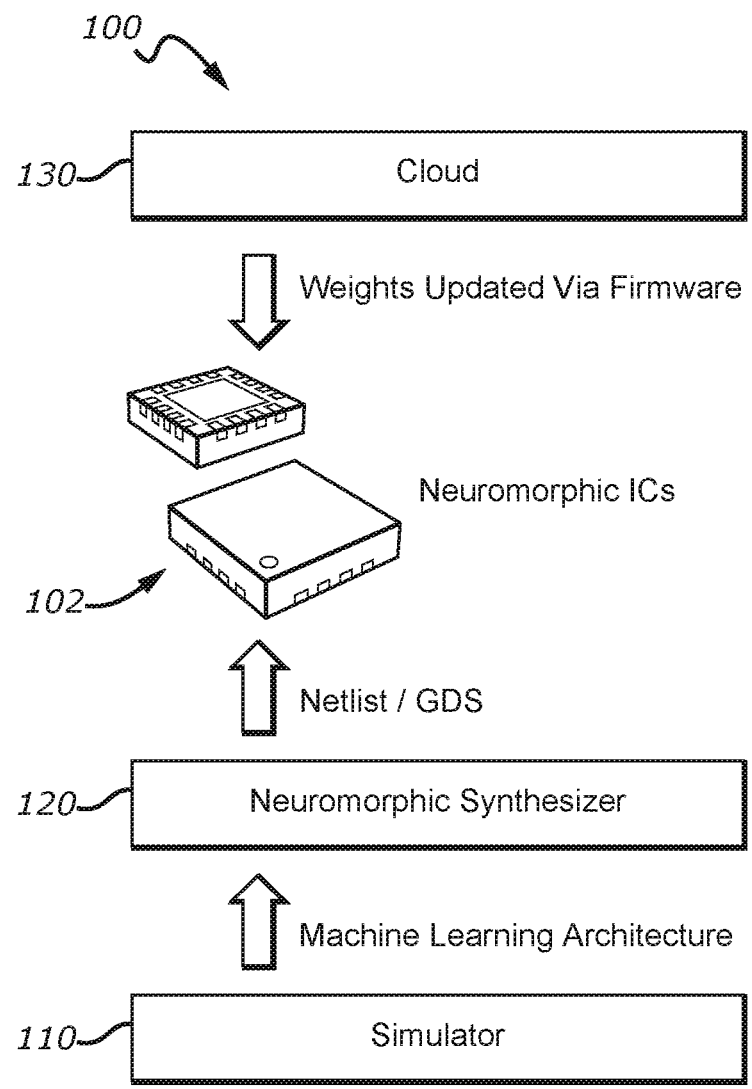
FIG. 1 illustrates a system for designing and updating neuromorphic ICs in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The term "logic" can be representative of hardware, firmware and/or software that is configured to perform one or more functions. As hardware, logic can include circuitry having data processing or storage functionality. Examples of such circuitry can include, but are not limited or restricted to, a microprocessor, one or more processor cores, a programmable gate array, a microcontroller, a controller, an application specific integrated circuit ("ASIC"), wireless receiver, transmitter and/or transceiver circuitry, semiconductor memory, or combinatorial logic.

The term "process" can include an instance of a computer program (e.g., a collection of instructions, also referred to herein as an application). In one embodiment, the process can be included of one or more threads executing concurrently (e.g., each thread can be executing the same or a different instruction concurrently).

The term "processing" can include executing a binary or script or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed. Herein, the terms "binary file" and "binary" will be used interchangeably.

The term "file" is used in a broad sense to refer to a set or collection of data, information or other content used with a computer program. A file can be accessed, opened, stored, manipulated or otherwise processed as a single entity, object or unit. A file can contain other files and can contain related or unrelated contents or no contents at all. A file can also have a logical format or be part of a file system having a logical structure or organization of plural files. Files can have a name, sometimes called simply the "filename," and often appended properties or other metadata. There are many types of files, such as data files, text files, program files, and directory files. A file can be generated by a user of a computing device or generated by the computing device. Access and/or operations on a file can be mediated by one or more applications and/or the operating system of a computing device. A filesystem can organize the files of the computing device of a storage device. The filesystem can enable tracking of files and enable access of those files. A filesystem can also enable operations on a file. In some embodiments the operations on the file can include file creation, file modification, file opening, file reading, file writing, file closing, and file deletion.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Unless defined otherwise, all technical and scientific terms used herein have the same meaning as commonly understood by those of ordinary skill in the art.

System for Designing and Updating Neuromorphic ICs

There are research efforts to develop direct hardware implementations of deep neural networks that attempt to simulate neurons with "silicon neurons" in "neuromorphic computing." Neuromorphic processors (e.g., processors designed for neuromorphic computing) operate by processing instructions in parallel (e.g., in contrast to traditional sequential computers) using bursts of electric current transmitted at non-uniform intervals. As a result, neuromorphic processors require far less power to process information, specifically, artificial intelligence ("AI") algorithms. To accomplish this, neuromorphic processors can contain as much as five times as many transistors as traditional processors while consuming up to 2000 times less power. Thus, the development of neuromorphic processors is directed to provide a neuromorphic processor with vast processing capabilities that consumes far less power than conventional processors. Further, neuromorphic processors are designed to support dynamic learning in the context of complex and unstructured data.

Figure 2:
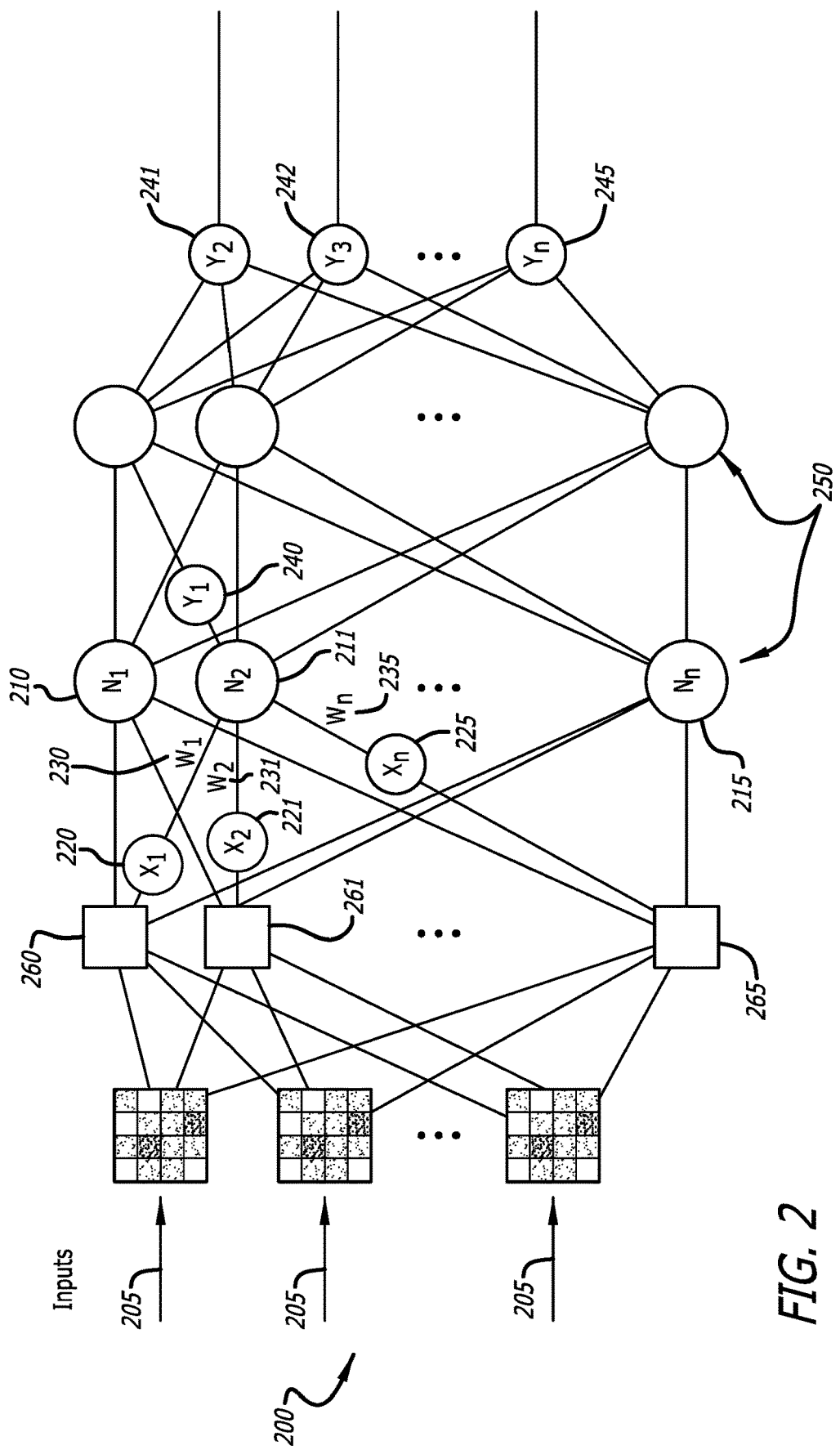
FIG. 2 illustrates a multilayered neural network in accordance with some embodiments.

FIG. 1 illustrates a system 100 for designing and updating neuromorphic ICs (e.g., ICs including one or more neuromorphic processors) in accordance with some embodiments. As shown, the system 100 can include a simulator 110, a neuromorphic synthesizer 120, and a cloud 130 configured for designing and updating neuromorphic ICs such as neuromorphic IC 102. As further shown, designing and updating neuromorphic ICs can include creating a machine learning architecture with the simulator 110 based on a particular problem. The neuromorphic synthesizer 120 can subsequently transform the machine learning architecture into a netlist directed to the electronic components of the neuromorphic IC 102 and the nodes to which the electronic components are connected. In addition, the neuromorphic synthesizer 120 can transform the machine learning architecture into a graphic database system ("GDS") file detailing the IC layout for the neuromorphic IC 102. From the netlist and the GDS file for the neuromorphic IC 102, the neuromorphic IC 102, itself, can be fabricated in accordance with current IC fabrication technology. Once the neuromorphic IC 102, itself, is fabricated, it can be deployed in a sensor-processing system including, for example, a single monolithic integrated circuit, a stacked die assembly, a multi-chip module (e.g., a printed circuit board assembly), or separate integrated circuits of separate modules to work on the particular problem for which it was designed. While the initially fabricated neuromorphic IC 102 can include an initial firmware with custom synaptic weights between the neural nodes as shown in FIG. 2, the initial firmware can be updated as needed by the cloud 130 to adjust the weights. Being as the cloud 130 is configured to update the firmware of the neuromorphic IC 102, the cloud 130 is not needed for everyday use.

Neuromorphic ICs such as the neuromorphic IC 102 can be up to 100× or more energy efficient than, for example, graphics processing unit ("GPU") solutions and up to 280× or more energy efficient than digital CMOS solutions with accuracies meeting or exceeding comparable software solutions. This makes such neuromorphic ICs suitable for battery powered applications.

Neuromorphic ICs such as the neuromorphic IC 102 can be configured for application specific standard products ("ASSP") including, but not limited to, keyword spotting, voice recognition, one or more audio filters, speech enhancement, gesture recognition, image recognition, video object classification and segmentation, or autonomous vehicles including drones. For example, if the particular problem is one of keyword spotting (e.g., recognizing a keyword and classifying it as such), the simulator 110 can create a machine learning architecture with respect to one or more aspects of keyword spotting. If the particular problem is one of image recognition (e.g., recognizing an image of a cat or a dog and classifying it as such), the simulator 110 can create a machine learning architecture with respect to one or more aspects of the image recognition. The neuromorphic synthesizer 120 can subsequently transform the machine learning architecture into a netlist and a GDS file corresponding to a neuromorphic IC for keyword spotting or image recognition, which can be fabricated in accordance with current IC fabrication technology. Once the neuromorphic IC for keyword spotting or image recognition is fabricated, it can be deployed in, for example, a multi-chip module (e.g., a printed circuit board assembly) or a stacked die assembly to work on keyword spotting or image recognition in a system or device in need of keyword spotting or image recognition such as smartphone.

Neuromorphic ICs such as the neuromorphic IC 102 can be deployed in toys, sensors, wearables, augmented reality ("AR") systems or devices, virtual reality ("VR") systems or devices, mobile systems or devices (e.g., smartphones), appliances, Internet-of-things ("IoT") devices, or hearing systems or devices.

Multilayered Neural Networks

FIG. 2 illustrates a multilayered neural network 200 in accordance with some embodiments. The neural network 200 includes a highly interconnected network of the neural nodes, or neurons, with synapses between the neural nodes having the custom synaptic weights. In many embodiments, the network inputs 205 can be linked to a series of summation modules 260, 261, 265. Each of the neural nodes can be associated with a two-quadrant multiplier of a multiplier array. A neuron (e.g., neuron $N_1$ 210, $N_2$ 211 up to a $N_2$ 215) can receive summed data (e.g., first input $x_1$ 220, second input $x_2$ 221 up to a $x_n$ 225 etc.) from an input or one or more other neurons respectively through one or more of the synapses having the custom weights (e.g., first synapse weight $w_1$ 230, second synapse weight $w_2$ 231, up to an nth synapse weight $w_n$ 235, etc.), process the data, and send processed data to an output (any outputs $Y_2$ 241, $Y_3$ 242, $Y_N$ 245) or yet one or more of the other neurons (e.g., output $Y_1$ 240, etc.) respectively through one or more other weighted synapses. The neural network 200 including the one or more neurons thereof can be generated in hardware and subsequently trained as set forth herein. In the multilayered neural network 200 illustrated in FIG. 2, the neural layers between the inputs and outputs are hidden layers 250. As those skilled in the art will recognize, this is an exemplary neural network and other neural networks of various size, depths and/or complexities may be utilized in the following embodiments.

Sensor-Processing Systems Including a Sensor and One or More Neuromorphic ICs

Figure 3:
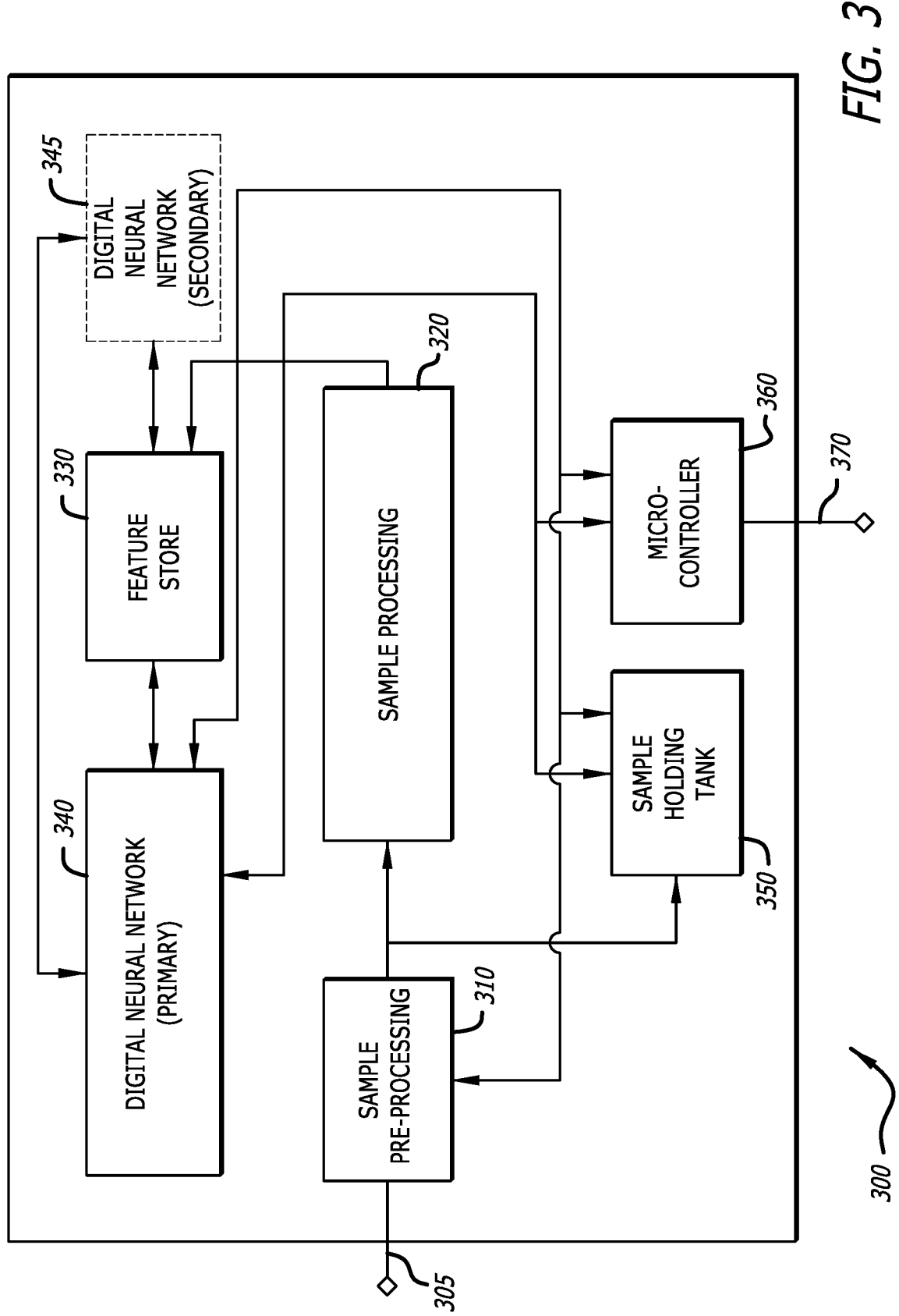
FIG. 3 illustrates one or more neuromorphic ICs of a sensor-processing system configured with a sensor in accordance with some embodiments.
Figure 4:
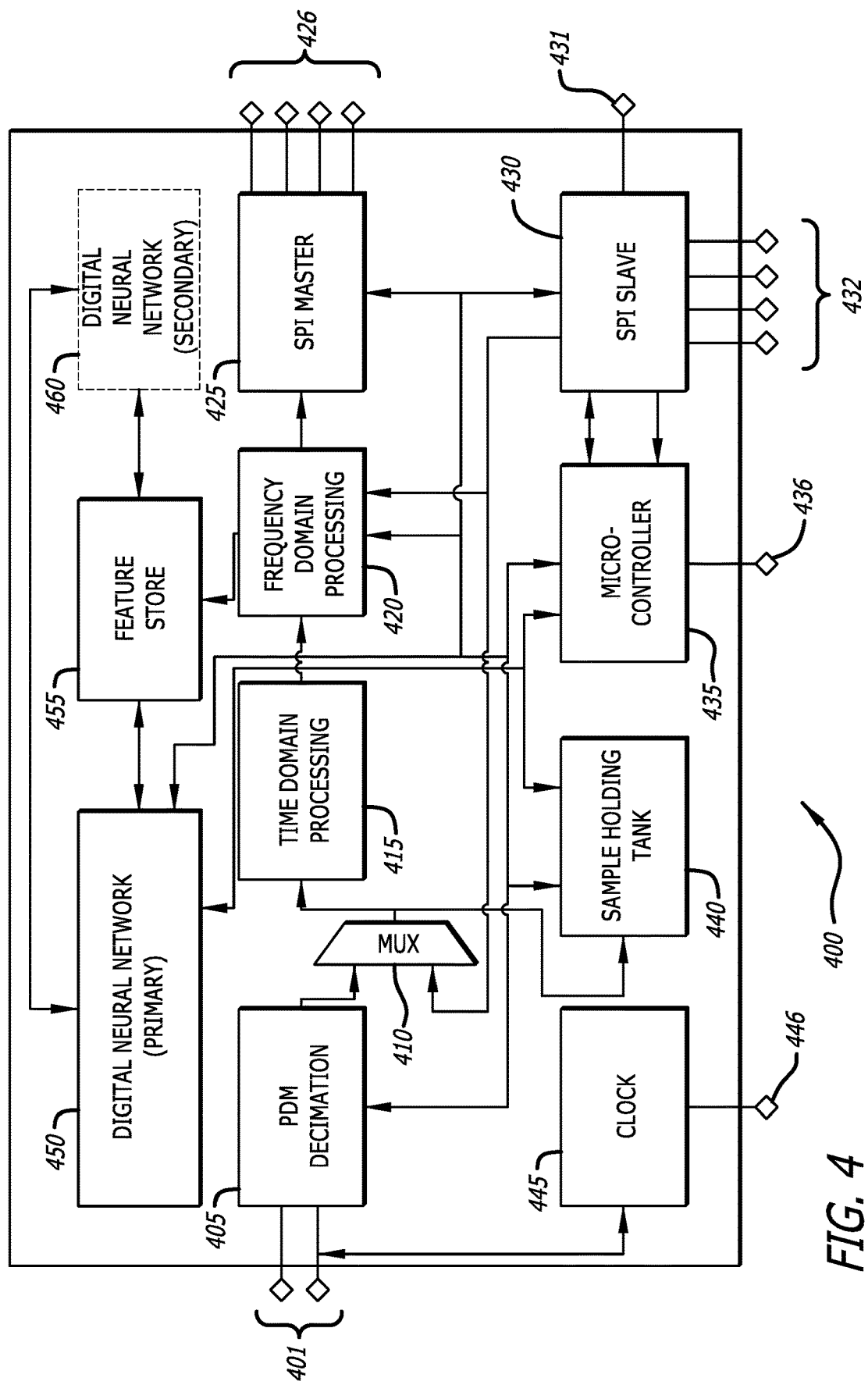
FIG. 4 illustrates one or more neuromorphic ICs of a sensor-processing system configured with a microphone in accordance with some embodiments.

FIG. 3 illustrates one or more neuromorphic ICs of a sensor-processing system 300 configured with a sensor in accordance with some embodiments. FIG. 4 illustrates one or more neuromorphic ICs of a sensor-processing system 400 configured with an input such as a microphone as the sensor in accordance with some embodiments. While the following description is primarily directed to a sensor-processing system having one or more neuromorphic ICs and a microphone, it should be understood that any sensor or any number of sensors can be used instead of the microphone. In addition, any of a number of combinations of sensors can also be used. Therefore, aspects of the following description not specifically related to processing microphone data should be understood as related to processing sensor data.

As shown in FIG. 3, the sensor-processing system 300 can be configured with one or more neuromorphic ICs including a relatively large, primary neural network (e.g., disposed in 2.2 Mbit random-access memory ["RAM"]) and, optionally, a relatively small, secondary neural network (e.g., disposed in <<2.2 Mbit RAM), a sensor (e.g., a microphone), and a microcontroller including one or more CPUs (as processor cores) along with memory. Any of a number of differently sized neural networks can be used so long as energy consumed by the number of differently sized neural networks is less than that consumed by a single large network. Such neural networks can be a deep neural networks having a power requirement proportional to its size. The sensor-processing system 300 can be further configured with one or more sample pre-processing modules for pre-processing samples of sensor data from the sensor. The one or more sample pre-processing modules are configured to process raw sensor data including, for example, formatting it for use in the sensor-processing system 300. The sensor-processing system 300 can be further configured with one or more sample holding tanks, or sample buffers, to temporarily hold pre-processed sensor data ready for use in the sensor-processing system 300. The sensor-processing system 300 can be further configured with one or more sample-processing modules for processing samples of the pre-processed sensor data including, for example, extracting features from the pre-processed sensor data, which features can be stored in a feature store of the sensor-processing system 300. At least the neural network (e.g. the primary neural network) can use the features extracted from the pre-processed sensor data to arrive at actionable decisions of the neural network.

In many embodiments, the sensor-processing system 300 can include an input 305 which feeds into a sample pre-processing unit 310. A sample processing unit 320 can be commutatively coupled with a feature store 330 and the sample pre-processing unit 310. In further embodiments, a digital neural network 340 can be a primary network within the sensor-processing system. In certain embodiments, a digital neural network 345 can act as a secondary network and be in communication with the primary digital neural network 340. The sensor-processing system 300 may also include a micro-controller 360 which can provide a general purpose input/output 370 connection. In additional embodiments, a sample holding tank 350 may be implemented with the sample processing 320 and pre-processing 310 units.

Again, it should be understood that any sensor(s) of a number or sensors can be used in the sensor-processing system 300 of FIG. 3. One or more sensors for the sensor-processing system 300 can be selected from, but are not limited to, an analog or digital microphone, an accelerometer, a gyroscope, a magnetometer, a tilt sensor, a temperature sensor, a humidity sensor, a barometer, a proximity sensor, a light sensor (e.g., ambient light sensor), an infrared sensor, a color sensor, a pressure sensor, a touch sensor, a flow sensor, a level sensor, an ultrasonic sensor, a smoke sensor, a gas sensor, and an alcohol sensor.

The sensor-processing system 400 of FIG. 4 is the sensor-processing system 300 configured with a microphone as the sensor, as well as some additional features specifically related to processing microphone (or other audio input) data such as for keyword spotting. The one or more sample pre-processing modules of the sensor-processing system 400 include a PDM decimation module 405 configured to decimate PDM microphone audio samples from an audio input source 401 to a baseband audio sampling rate (e.g., 16 kHz) for use in the sensor-processing system 400. The one or more sample-processing modules of the sensor-processing system 400 include a time domain processing module 415 and a frequency domain processing module 420 in the sensor-processing system 400. The time domain processing module 415 is configured to process amplitudes of signals (if any) present in the audio samples muxed by a mux module 410 and decimated to the baseband audio sampling rate. The frequency domain processing module 420 is configured to process frequencies of the signals (if any) present in the audio samples. By processing the audio samples in such an order, the sensor-processing system 400 can first determine with the time domain-processing module whether a signal is present and, if so, subsequently determine with the frequency domain-processing module whether the signal corresponds to speech. In addition, the sensor-processing system 400 includes a clock 445 (with clock input 446) and a Serial Peripheral Interface ("SPI") master 425 and an SPI slave 430, wherein the SPI master 425 and SPI slave 430 (with associated inputs 431 and outputs 432) are configured to output data via a series of outputs 426, 432 resulting from at least the time-and-frequency-domain processing for other systems configured to handle (e.g., further analyze) such data.

In many embodiments, the sensor-processing system 400 can also include a sample holding tank 440 which can direct data to the time domain processing module 415, and is also in communication with a micro-controller 435 and associated general purpose input/output 436. Additionally, further embodiments comprise a primary digital neural network 450 to process the received audio input data, and (in some embodiments) comprises a secondary digital neural network 460 in communication with the primary digital neural network 450 and a feature store 455.

The sensor-processing system 400 of FIG. 4 can be configured as an always-on keyword spotter. That is, the sensor-processing system 400 can be configured to always listen for keywords the neural network can operate on and classify; however, the sensor-processing system 400, which can be configured as a front end to a mobile computer such as a smartphone, should consume as little power as possible. As such, the sensor-processing system 400 can be configured such that a minimum of components of the sensor-processing system 400 are powered on and operating during initial stages of keyword spotting. Any algorithm(s) of a number of algorithms set forth below can be used to minimize power consumption of the sensor-processing system 400.

In the algorithms set forth below, at least one of the components that should be powered on and operating during the keyword spotting is the PDM microphone and the PDM decimation module, which consume a relatively low amount of power. The time domain-processing module, which also consumes a relatively low amount of power, should be powered on and operating during the keyword spotting. In addition, the frequency-domain module, which also consumes a relatively low amount of power, can be powered on and operating during the keyword spotting. However, the neural network need not be powered on and operating during initial stages of keyword spotting because the neural network can consume a relatively high amount of power compared to any one of the PDM microphone, the PDM decimation module, the time domain-processing module, or the frequency domain-processing module.

Figure 5:
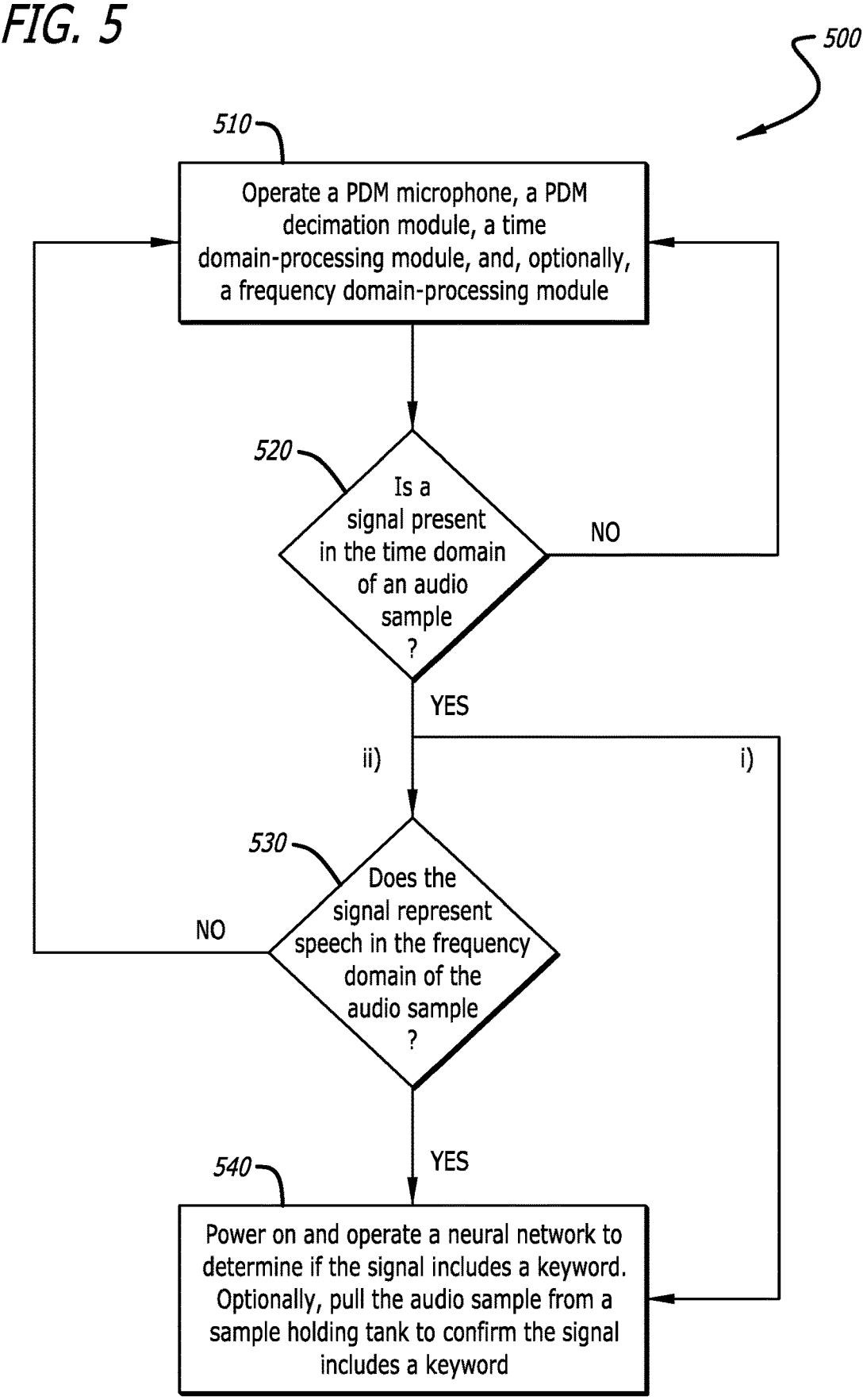
FIG. 5 illustrates an algorithm for conditional neural network operation upon detection of a credible signal with one or more sample-processing modules in accordance with some embodiments.

Conditional Neural Network Operation Upon Detection of a Credible Signal with One or More Sample-Processing Modules FIG. 5 illustrates an algorithm 500 for conditional neural network operation upon detection of a credible signal with one or more sample-processing modules in accordance with some embodiments.

As shown, the algorithm 500 includes operating the PDM microphone, the PDM decimation module, the time domain-processing module, and, optionally, the frequency domain-processing module (block 510). Since the time domain-processing module is configured to process amplitudes of signals (if any) present in the audio samples decimated to the baseband audio sampling rate, the time domain-processing module can determine whether a signal (e.g., a signal corresponding to a hand clap, gun shot, speech, etc.) is present in an audio sample or not (block 520). For example, the time domain-processing module can determine whether a signal in a moving window exceeds a threshold value (block 530). If a signal is not present in the time domain of an audio sample, the sensor-processing system 400 can be configured to continue operating at least the PDM microphone, the PDM decimation module, and the time domain-processing module. When a signal is present in the time domain of an audio sample, the sensor-processing system 400 can be configured to power on and operate the neural network to determine if the signal includes a keyword (block 540). Optionally, the audio sample can be pulled from the sample holding tank (such as the sample holding tank 350, 440 of FIGS. 3 and 4 respectively) to determine if the signal includes a keyword.

As an alternative to powering on and operating the neural network to determine if the signal from the time domain includes a keyword, the sensor-processing system 400 can be configured to additionally operate the frequency domain-processing module, which provides more discerning audio sample processing. Since the frequency domain-processing module is configured to process frequencies of signals (if any) present in the audio samples, the frequency domain-processing module can determine whether the signal corresponds to speech. For example, the frequency domain-processing module can determine whether a signal in a moving window falls within a certain frequency range. When a signal is present in the time domain of an audio sample, but the signal does not represent speech in the frequency domain of the audio sample, the sensor-processing system 400 can be configured to continue operating the PDM microphone, the PDM decimation module, the time domain-processing module, and the frequency domain-processing module. However, when a signal is present in the time domain of an audio sample and the signal represents speech in the frequency domain of the audio sample, the sensor-processing system 400 can be configured to power on and operate the neural network to determine if the signal includes a keyword. Again, the audio sample can be pulled from the sample holding tank to determine if the signal includes a keyword.

In this way, the always-on keyword spotter can be configured to consume as little power as possible until at least a credible signal such as a credible signal representing speech is detected. By only powering on and operating the neural network when such a credible signal is detected, the sensor-processing system 400 can be configured to always listen for keywords without adding a user-noticeable load on battery-powered devices such as smartphones.

Figure 6:
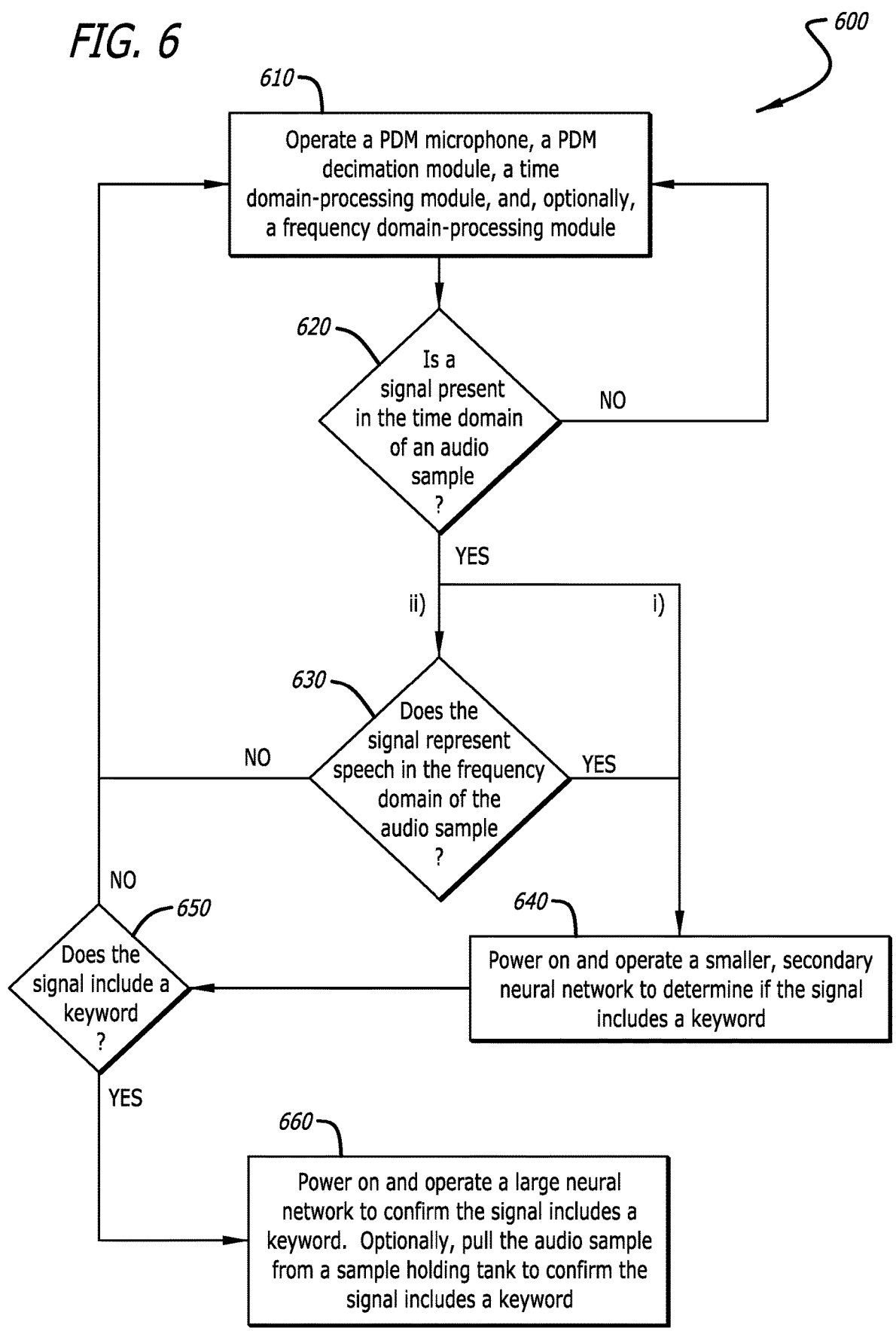
FIG. 6 illustrates an algorithm for conditional neural network operation upon detection of a credible keyword with one or more smaller and/or lower-powered neural networks in accordance with some embodiments.

Conditional Neural Network Operation Upon Detection of a Credible Keyword with a Smaller, Lower-Powered Neural Network FIG. 6 illustrates an algorithm 600 for conditional neural network operation upon detection of a credible keyword with a plurality of smaller and/or lower-powered neural networks in accordance with some embodiments.

As shown, the algorithm 600 follows on the algorithm 500 in that the algorithm 600 includes operating the PDM microphone, the PDM decimation module, the time domain-processing module, and, optionally, the frequency domain-processing module (block 610). When a signal is present in the time domain of an audio sample or in both the time domain and the frequency domain of the audio sample, the sensor-processing system 400 can be configured to power on and operate a neural network to determine if the signal includes a keyword or a portion of a keyword (e.g., "Ale," pronounced "ə-le," as part of "Alexa") (blocks 620, 630 and 640). However, the neural network is the smaller, secondary neural network set forth above instead of the larger, primary neural network primarily discussed herein. Again, the power requirement of a neural network is generally proportional to its size, so powering on and operating the secondary network can be more energy efficient for the initial stages of keyword spotting, especially over time as the signals in either the time domain or the frequency domain are found not to contain keywords. This is true even in consideration of the secondary neural network falsely detecting keywords due to its diminished processing capability. When a keyword is credibly detected by the secondary network in a signal of either the time domain or the frequency domain of an audio sample, the sensor-processing system 400 can be configured to power on and operate the primary neural network to confirm the signal includes a keyword (blocks 650 and 660). Optionally, the audio sample can be pulled from the sample holding tank (such as, for example, the sample holding tank 350, 440 of FIGS. 3 and 4 respectively) to confirm if the signal includes a keyword.

In this way, the always-on keyword spotter can be configured to consume as little power as possible until at least a keyword is credibly detected. By only powering on and operating the primary neural network when a keyword is credibly detected, the sensor-processing system 400 can be configured to always listen for keywords without adding a user-noticeable load on battery-powered devices such as smartphones.

Intervallic Neural Network Operation

Figure 7:
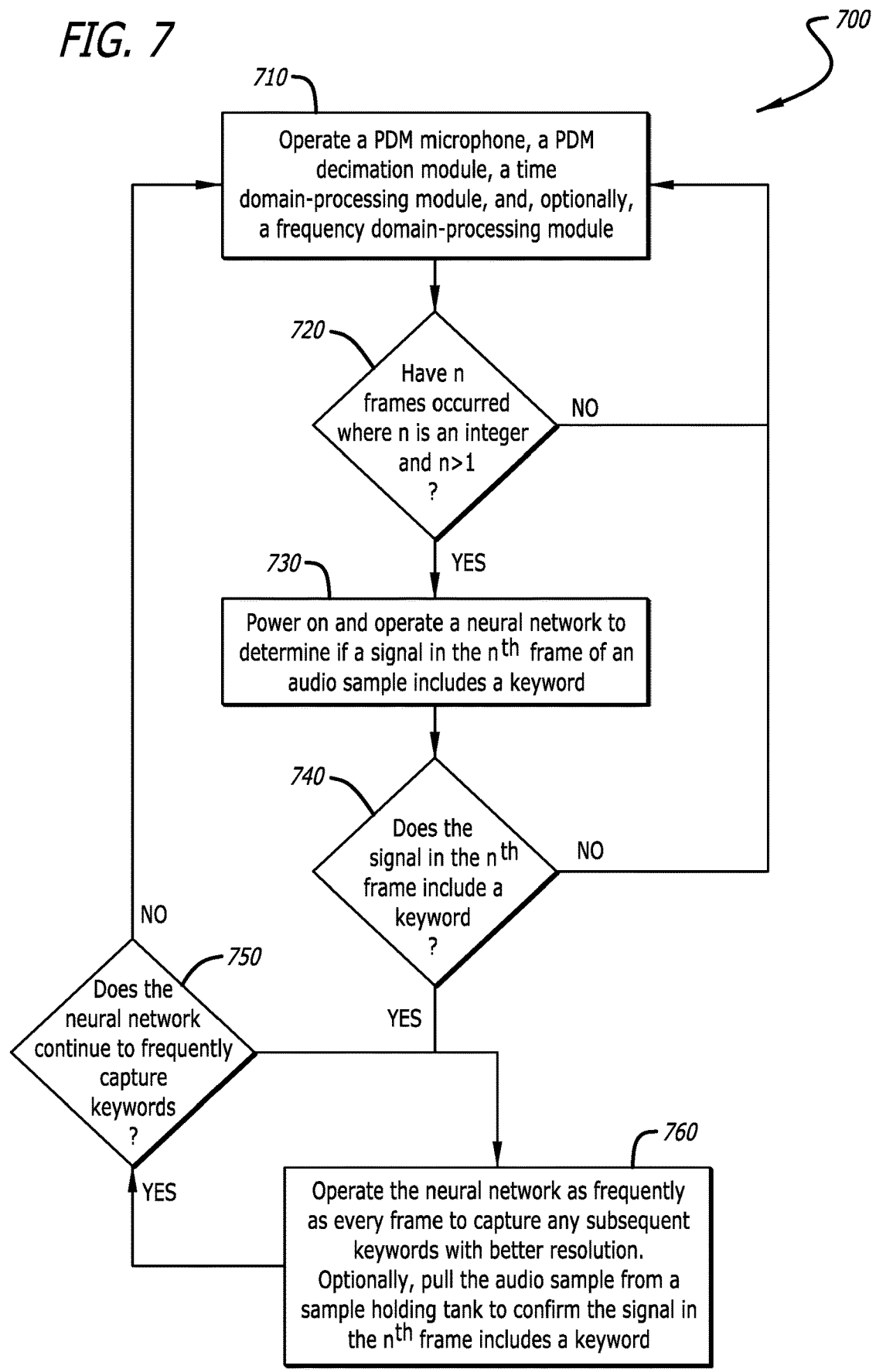
FIG. 7 illustrates an algorithm for intervallic neural network operation in accordance with some embodiments.

FIG. 7 illustrates an algorithm 700 for intervallic neural network operation in accordance with some embodiments.

As shown, the algorithm 700 includes operating the PDM microphone, the PDM decimation module, the time domain-processing module, and, optionally, the frequency domain-processing module for at least n frames of an audio sample, wherein n is an integer, and wherein n>1 (block 710). Frames, which are portions of audio samples, can span a predetermined amount of time such as 10 ms. Larger frames can be used to further reduce power consumption but there is a tradeoff in that a signal in an audio sample can be missed. After at least n frames of an audio sample (e.g., after at least 4 10-ms frames or 40 ms), the sensor-processing system 400 can be configured to power on and operate the neural network to determine if the $n^{th}$ frame of the audio sample includes a keyword or a portion of a keyword (block 720 and 730). If a keyword or a portion of a keyword is not present in the $n^{th}$ frame of the audio sample, the sensor-processing system 400 can be configured to continue operating at least the PDM microphone, the PDM decimation module, the time domain-processing module, and, optionally, the frequency domain-processing module for at least another n frames of an audio sample. In many embodiments, once a keyword or a portion of a keyword is determined by the neural network to be present in an $n^{th}$ frame of an audio sample, the sensor-processing system 400 can be configured to operate the neural network as at a frequency capable of processing every frame of every audio sample to capture any subsequent keywords with better resolution (block 740 and 760).

Optionally, the audio sample triggering the increased frequency of operating the neural network can be pulled from the sample holding tank to confirm the audio sample includes the keyword. As long as the neural network continues to capture keywords as frequently as every frame of every audio sample, the sensor-processing system 400 can be configured to operate the neural network at such a rate (block 750). However, if keywords or portions of keywords are not present after at least n frames of an audio sample, the sensor-processing system 400 can be configured to power on and operate the neural network in its default mode such as after at least n frames of an audio sample (e.g., after at least 4 10-ms frames or 40 ms).

In this way, the always-on keyword spotter can be configured to consume as little power as possible until at least a keyword or a portion of a keyword is credibly detected. By only powering on and operating the primary neural network in intervals (e.g., every $n^{th}$ frame of an audio sample), the sensor-processing system 400 can be configured to always listen for keywords without adding a user-noticeable load on battery-powered devices such as smartphones.

Figure 8:
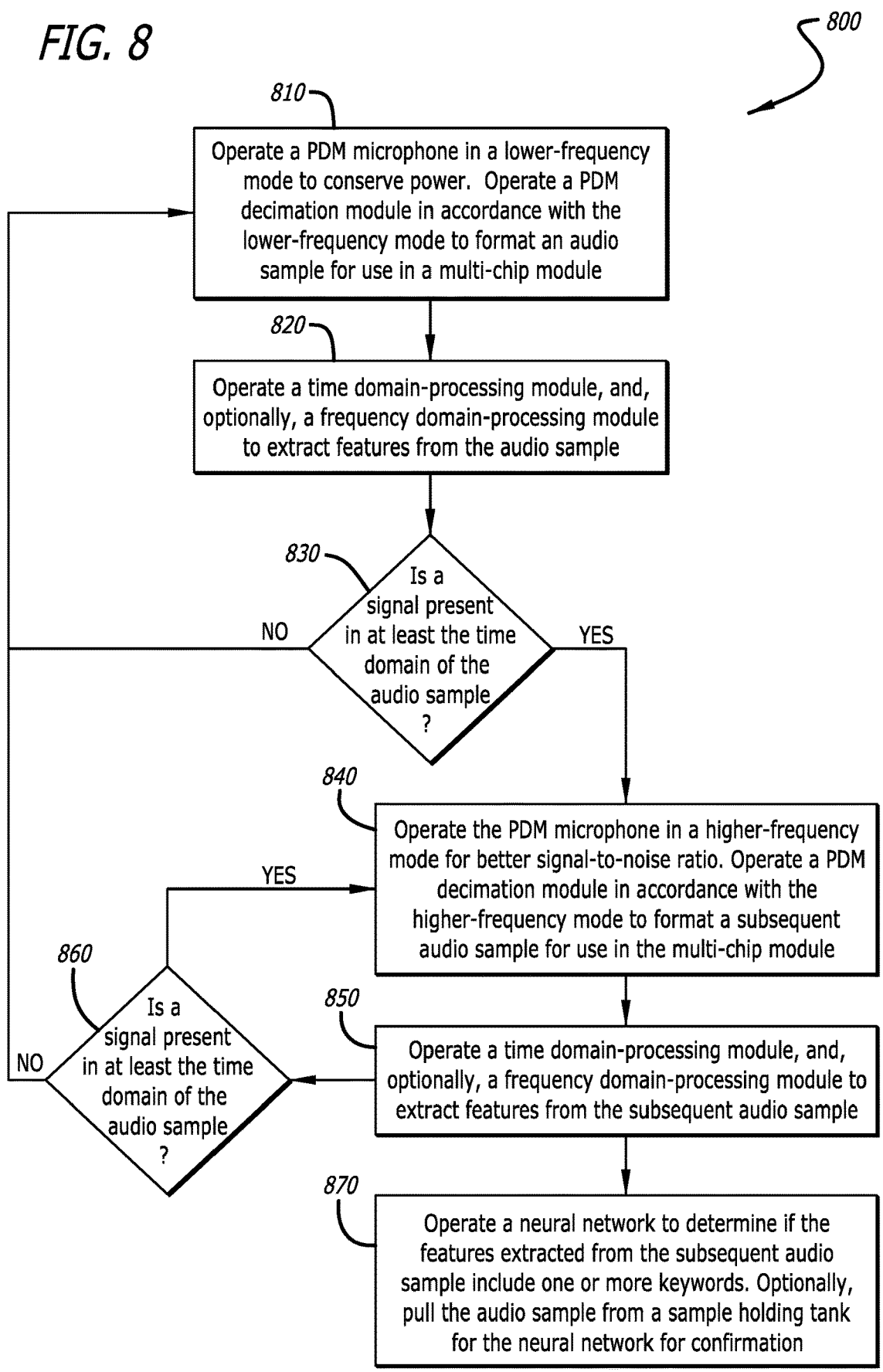
FIG. 8 illustrates an algorithm for microphone-mode switching upon detection of one of more keywords using one or more sample-processing modules in accordance with some embodiments.

Microphone-Mode Switching Upon Credible Detections with One or More Sample-Processing Modules FIG. 8 illustrates an algorithm 800 for microphone-mode switching upon detection of one of more keywords using one or more sample-processing modules in accordance with some embodiments. As shown, the algorithm 800 includes operating the PDM microphone in a lower-frequency mode to conserve power (block 810). The PDM decimation module can be configured to operate in accordance with the lower-frequency mode to decimate an audio sample from the PDM microphone to a baseband audio sampling rate (e.g., 16 kHz) for use in the sensor-processing system 400. Once formatted for use in the sensor-processing system 400, the time domain-processing module, and, optionally, the frequency domain-processing module can be configured to extract features from the audio sample (block 820). If a signal is not present in at least the time domain of the audio sample, the PDM microphone can be configured to continue operating in the lower-frequency mode (block 830). However, if a signal is present in at least the time domain of the audio sample, the PDM microphone can be configured to operate in a second, higher-frequency mode for better signal-to-noise ratio for a subsequent audio sample (block 840). In accordance with the higher-frequency mode of the PDM microphone, the PDM decimation module can be configured to operate in accordance with the higher-frequency mode to decimate the subsequent audio sample from the PDM microphone to a baseband audio sampling rate (e.g., 16 kHz) for use in the sensor-processing system 400 (block 850). The sensor-processing system 400 can be configured to operate a time domain-processing module, and, optionally, a frequency domain-processing module to extract features from the subsequent audio sample. As long as a signal remains present in at least the time domain of one or more further audio samples, the PDM microphone can be configured to operate in the higher-frequency mode for better signal-to-noise ratio (block 860). The neural network of the sensor-processing system 400 can be configured to determine if the features extracted from the subsequent audio sample or any of the one or more further audio samples include one or more keywords (block 870). Optionally, the triggering audio sample can be pulled from the sample holding tank to confirm if the signal includes a keyword.

In this way, the always-on keyword spotter can be configured to consume as little power as possible until at least a signal in at least the time domain is credibly detected. By only operating the PDM microphone in the higher-frequency mode when one or more signals are present, the sensor-processing system 400 can be configured to always listen for keywords without adding a user-noticeable load on battery-powered devices such as smartphones.

Identifying Assigned Speakers

Figure 9:
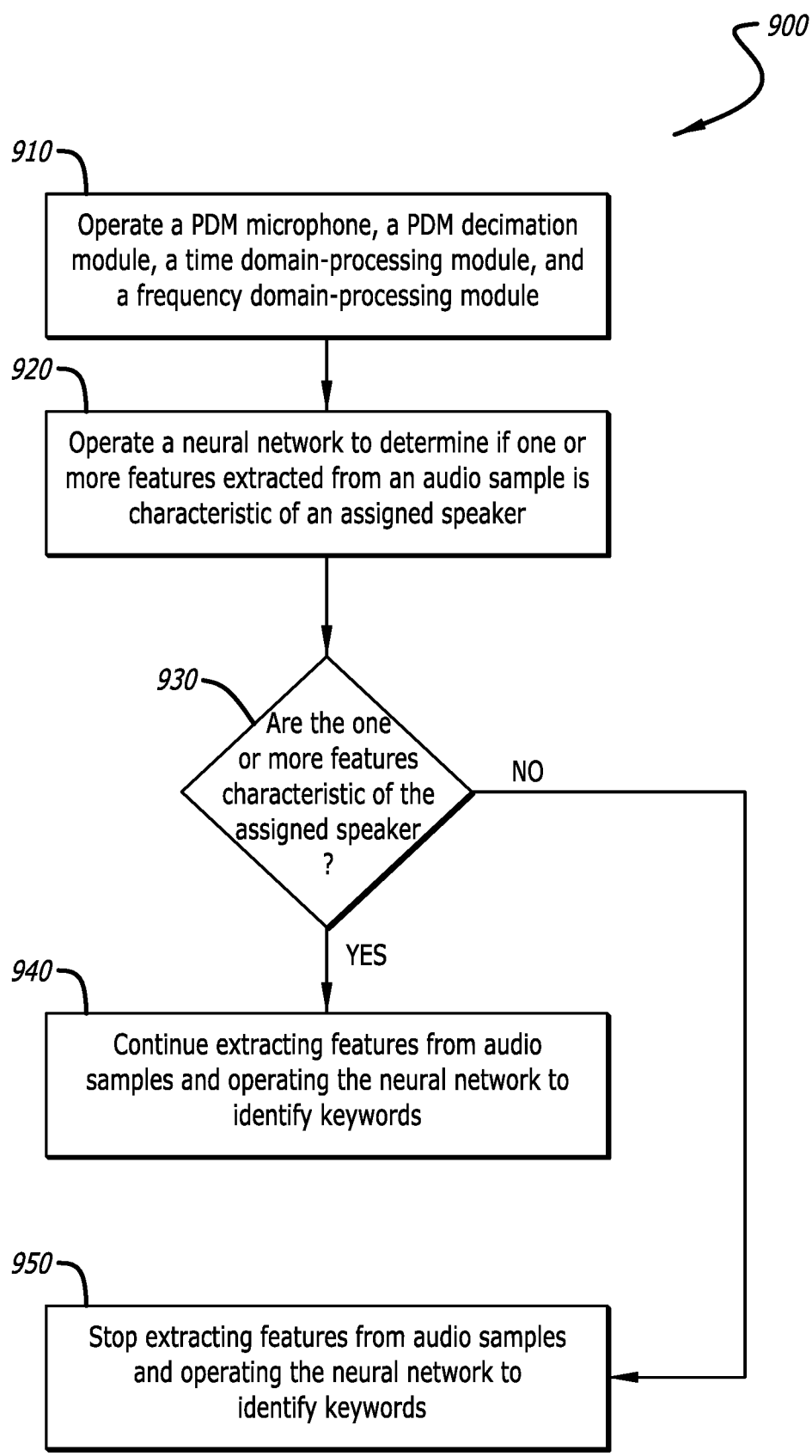
FIG. 9 illustrates an algorithm for identifying assigned speakers for speaker identification in accordance with some embodiments.

FIG. 9 illustrates an algorithm 900 for identifying assigned speakers for speaker identification in accordance with some embodiments. As shown, the algorithm 900 includes operating the PDM microphone, the PDM decimation module, the time domain-processing module, and, the frequency domain-processing module (block 910). The sensor-processing system 400 can be configured to operate a neural network to determine if one or more features extracted from an audio sample are characteristic of an assigned speaker (block 920). If the one or more features extracted from the audio sample are not characteristic of the assigned speaker, the sensor-processing system 400 can be configured stop extracting features from audio samples and operating the neural network to identify keywords, which saves power (block 930 and 950). However, if the one or more features extracted from the audio sample are characteristic of the assigned speaker, the sensor-processing system 400 can be configured to continue extracting features from audio samples and operating the neural network to identify keywords (block 940).

In this way, the always-on keyword spotter can be configured to consume as little power as possible until an assigned speaker is credibly detected. By only operating the neural network when an assigned speaker is identified, the sensor-processing system 400 can be configured to always listen for keywords without adding a user-noticeable load on battery-powered devices such as smartphones.

Higher-Quality Processing Using Samples from a Sample Holding Tank

Figure 10:
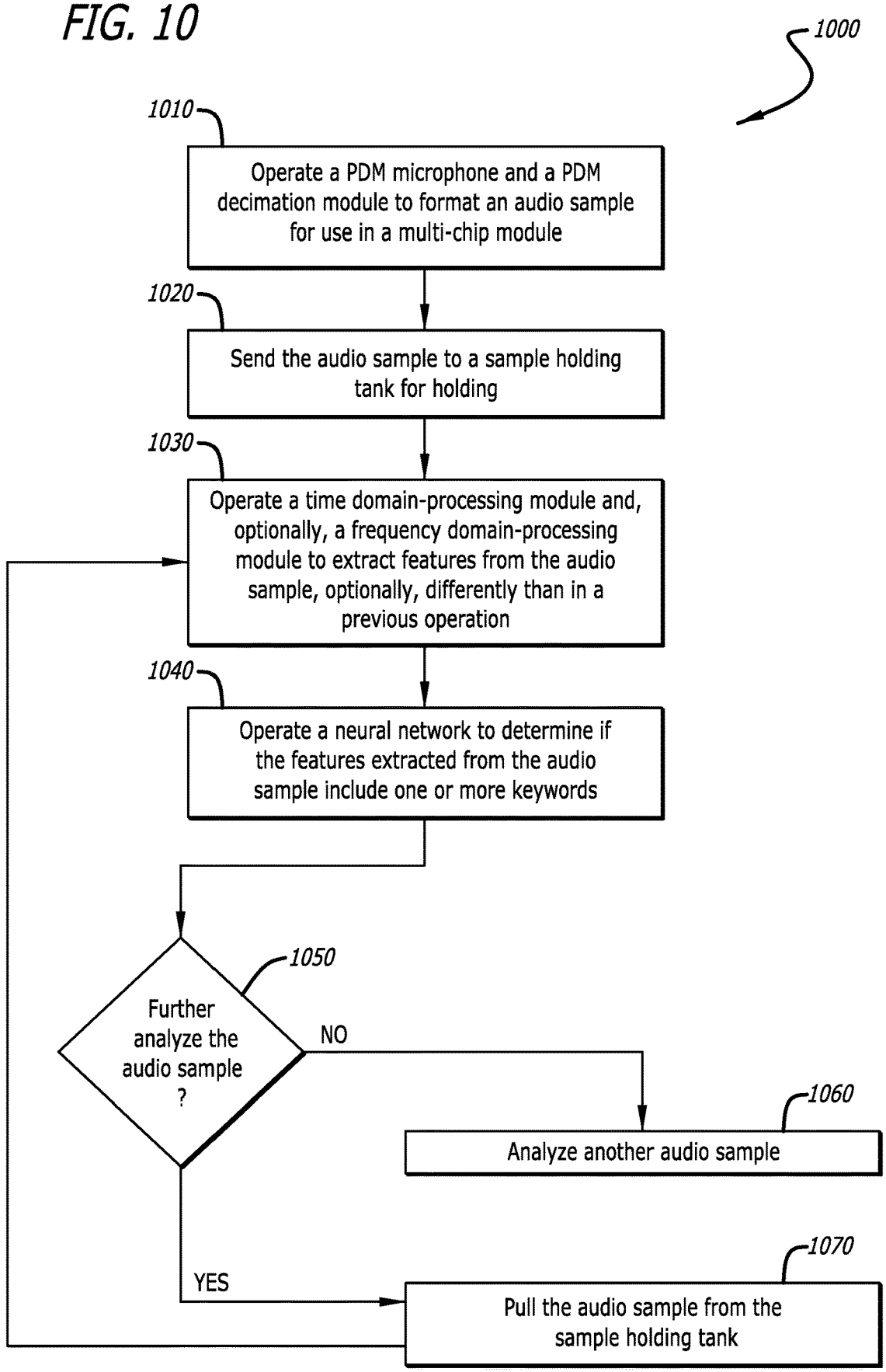
FIG. 10 illustrates an algorithm for higher-quality processing using audio samples from a sample holding tank in accordance with some embodiments.

FIG. 10 illustrates an algorithm 1000 for higher-quality processing using samples from a sample holding tank in accordance with some embodiments. As shown, the algorithm 1000 includes operating the PDM microphone and the PDM decimation module to at least format an audio sample for use in the sensor-processing system 400 (block 1010). Once formatted for use in the sensor-processing system 400, the audio sample can be sent to the sample holding tank, where the audio sample can be at least temporarily held for use by various components of the sensor-processing system 400 (block 1020). In addition to sending the audio sample to the sample holding tank, the sensor-processing system 400 can be configured to operate the time domain-processing module and, optionally, the frequency domain-processing module to extract one or more features (e.g., one or more signals in the time domain or both the time-and-frequency domains) from the audio sample (block 1030). While not shown in FIG. 10 such features can be at least temporarily stored in a feature store (see, for example, the feature store 455 of the sensor-processing system 400 in FIG. 4) for use by one or more neural networks such as the primary neural network. Indeed, the sensor-processing system 400 can be configured to operate the neural network to determine if the one or more features extracted from the audio sample include one or more keywords or portions of keywords (block 1040). If no further analysis of the audio sample is needed, the sensor-processing system 400 can be configured to analyze another audio sample (block 1050 and 1060). However, if further analysis of the audio sample is needed, the sensor-processing system 400 can be configured to pull the audio sample from the sample holding tank for subsequent time domain-processing and, optionally, frequency domain-processing to extract one or more different features (e.g., one or more signals in the time domain or both the time-and-frequency domains) from the audio sample (block 1070). The sensor-processing system 400 can be configured to operate the neural network to determine if the one or more different features extracted from the audio sample include one or more keywords or portions of keywords, and so on.

In this way, the always-on keyword spotter can be configured for higher-quality processing using samples from a sample holding tank. Such higher-quality processing is beneficial in view of one or more of the algorithms set forth herein that can be used in the sensor-processing system 400 so that it consumes as little power as possible until at least a keyword or a portion of a keyword is credibly detected. For example, the higher-quality processing can be used in any one or more of algorithms 500, 600, 700, 800 or 900 to confirm an initially processed signal from an audio sample includes one or more keywords of portions thereof. Therefore, such higher-quality processing using the samples from the sample holding tank complements the one or more of the algorithms set forth herein that can be used in the sensor-processing system 400 so that it consumes as little power as possible.

Neural Network Implementation

Figure 12:
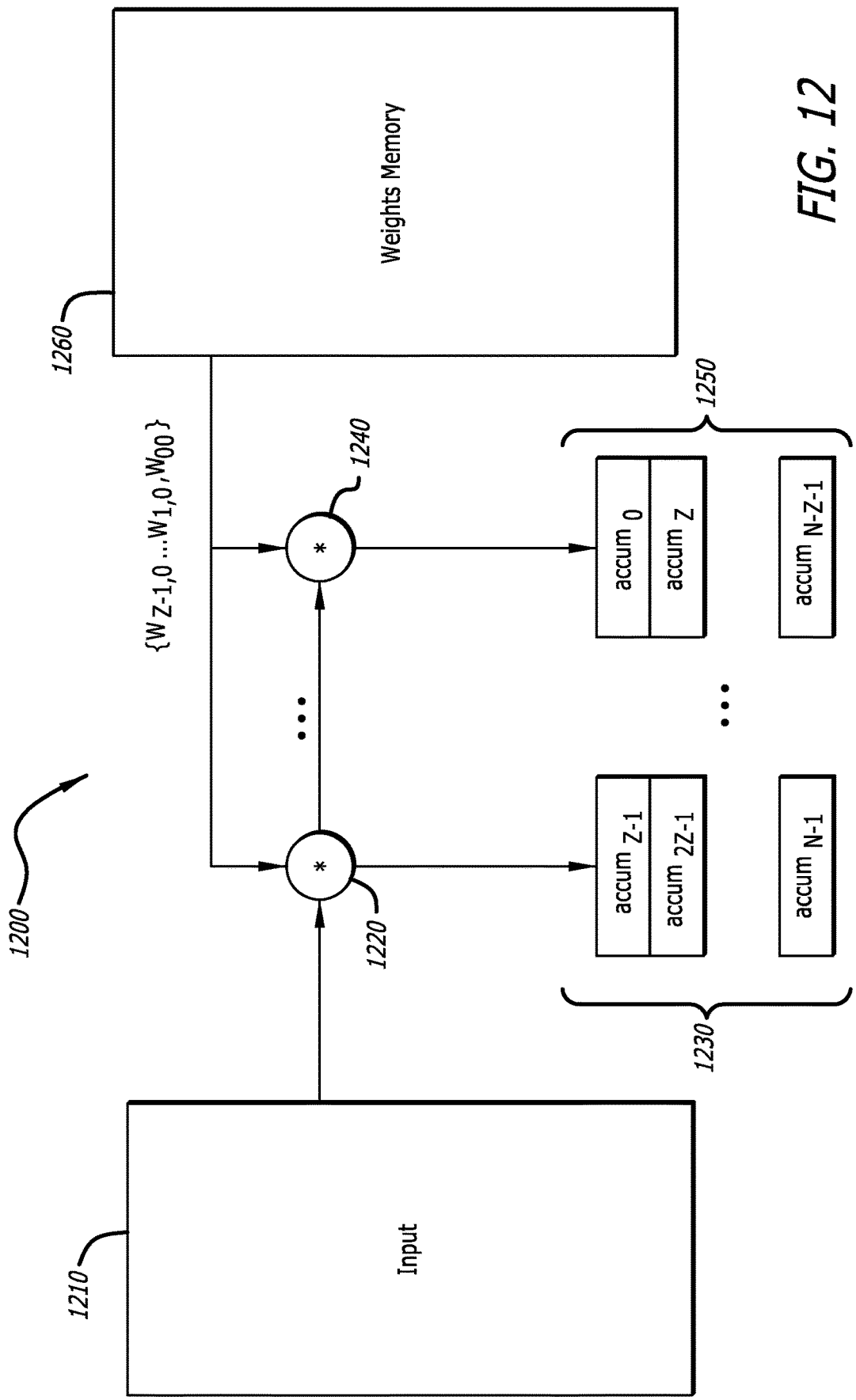
FIG. 12 illustrates an accumulator for a neural network in accordance with some embodiments.

FIG. 11 illustrates an m×n matrix operation 1100 for a neural network in accordance with some embodiments. FIG. 12 illustrates an accumulator 1200 for a neural network in accordance with some embodiments.

For the neural network, an m×n matrix operation 1100 can be implemented producing n outputs 1110 (which may correspond to a rectified linear unit ("ReLU") and receiving m inputs 1130. The neural network can be implemented by maintaining n parallel accumulators 1140 such as the accumulator 1200 that are configured to record partial sums for matrix operations of the matrix operation 1100. The implementation can proceed in a column-major order, wherein each input is applied to all the rows of the matrix for a given column and partially accumulated in a register. A notable benefit of this is that for every input value that is '0,' n multiple-accumulate operations can be removed. In the case of a neural network that is retrieving weights 1120 from static random-access memory ("SRAM"), memory reads on weights 1120 can be blocked. In the matrix operation 1100, reading the weights 1120 from SRAM can be dominant in terms of power consumption.

Column-Major Processing Order of Matrix Operations

A column-major processing order of matrix operations includes observing an input value 1210, and based on the input value 1210 being zero, skipping N multiple-operations in a particular row. This obviates reading unneeded weights 1260 from memory.

For example, in an m×n matrix, there are m×n weights that have to be read from memory. If the m×n matrix is a 256×256 matrix, there are the equivalent of $2^{16}-1$ or 65535 signed weights that need to be read from the weight memory 1260 to implement a complete matrix product. Each of these operations 1220 results in a set of calculated inputs 1230 with various values related to each specific input. If there are 256 inputs 1210, and those inputs 1210 each have a value of zero, 256 multiplication operations 1240 are avoided, thereby obviating reading the unneeded weights from the weight memory 1260. Thus, the resulting outputs 1250 would be written as zeros. Obviating reading unneeded weights from memory can reduce power consumption, particularly when compounded over time with many matrix operations.

Mapping Input Values to Zero Using Threshold Values

Setting a threshold value so that all inputs below the threshold value (i.e. weak inputs) are automatically mapped to zero significantly reduces a number of computations needed for a particular matrix operation.

For example, considering 7-bit inputs, the threshold value can be set to less than 4 such that all inputs less than 4 are mapped to zero while all values equal to or greater than four are provided with full precision for the matrix operation. Setting such a threshold value can reduce noise within the signal to be processed and can further reduce power requirements, particularly when compounded over time after many matrix operations.

Conditional Neural Network Operation if all Input Values are Zero

All input values to a neural network can be read in an initial operation, and, if all the input values are less than a threshold value, the neural network need not be operated. Reading all the input value to the neural network has a relatively low cost insofar as power consumption. Not operating the neural network and, instead, providing zeros as output values for activations or reducing the activation rates significantly reduces power requirements. Utilizing programming of devices to take advantage of this can yield lower power usage. Sample pseudo-code that can take advantage of this feature is described below:

Pseudo-code for Zero (skips N multiply accumulates for each input = 0)

```
for i in range(M):
    If (input[i] != 0):
        for j in range(N):
            y[j] += input[i]*w[i,j]
```

Conditional Neural Network Operation if Threshold Amount of Tracked Input Values are Zero As shown in FIG. 2, a neural network can include multiple layers including an input layer and a number of hidden layers. Often, a hidden layer has a zero output value that becomes the input value to a next layer such as another hidden layer. While such output values are not always observed, the output values can be tracked within the chipset. By tracking a number of internal neural nodes and finding that a threshold amount of the internal nodes are zero, at least a certain frequency of operations within the neural network can be diminished to significantly reduce power requirements. Optionally, the neural network, or portions thereof, can be stopped from operating if the threshold amount of the internal nodes are zero.

Pseudo-code for thresholds (skips N multiply accumulates per input < threshold)

```
For i in range(M):
    If (input[i] <= threshold):
        For j in range(N):
            Y[j] += input[i] * w[i,j]
```

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures can be made from the particular embodiments disclosed herein without departing from the scope of the concepts provided herein.

What is claimed is:

1. A sensor-processing system, comprising:
    one or more sensors that may be operated in first mode to conserve power, and a second mode to achieve a desired signal-to-noise ratio for a subsequent audio sample;
    one or more sample pre-processing modules configured to process raw sensor data for use in the sensor-processing system, wherein the one or more sample pre-processing modules include a PDM decimation module configured to decimate audio samples from a pulse-density modulation ("PDM") microphone to a baseband audio sampling rate for use in the sensor-processing system;
    one or more sample-processing modules comprising a time domain-processing module configured to process amplitudes of signals in the audio samples multiplexed by a mux module, and a frequency domain-processing module configured to process frequencies of the signals in the audio sample;
    wherein the time domain-processing module is configured to process amplitudes of signals in the audio samples multiplexed by a mux module;
    one or more sample-processing modules coupled with a feature store is configured to temporarily store features extracted from pre-processed sensor data and the one or more sample pre-processing modules, wherein the one or more sample-processing modules are configured to process pre-processed sensor data including extracting features from the pre-processed sensor data;
    a sample holding tank configured to temporarily store audio samples formatted for processing, wherein the sample holding tank is configured to provide audio samples for subsequent analysis;
    one or more neuromorphic Integrated Circuits ("ICs"), each neuromorphic IC comprising: a smaller, secondary neural network configured for initial keyword detection and assigned speaker identification and a larger, primary neural network configured to confirm keyword detection;

an initial firmware comprising synaptic weights that may be updated;

a microcontroller including at least one central-processing unit ("CPU") along with memory including instructions for operating the sensor-processing system, wherein the one or more sensors include at least one of: an accelerometer, a temperature sensor, and a microphone;

in response to determining that a signal is present in a time domain of an audio sample, determining whether the signal represents speech in the frequency domain of the audio sample and determining whether the speech includes features which are characteristic of an assigned speaker based on further analysis of the audio samples in the sample holding tank;

and, in response to determining that the signal represents speech and the speech includes features which are characteristic of an assigned speaker, operating the primary neural network to confirm presence of a keyword after initial detection by the secondary neural network.

2. The sensor-processing system of claim 1, wherein the feature store is configured to at least temporarily store the features extracted from the pre-processed sensor data for the one or more neuromorphic ICs.

3. The sensor-processing system of claim 1, wherein the sensor-processing system includes a single neuromorphic IC including a single neural network configured as a classifier.

4. The sensor-processing system of claim 1, wherein the sensor-processing system includes at least a first neuromorphic IC including a relatively larger, primary neural network and a second neuromorphic IC including a relatively smaller, secondary neural network; and wherein the primary neural network is configured to power on and operate on the features extracted from the pre-processed sensor data after the secondary neural network arrives at an actionable decision on the features extracted from the pre-processed sensor data, thereby lowering power consumption of a sensor-processing multi-chip.

5. The sensor-processing system of claim 1, wherein the sensor-processing system is configured as a keyword spotter; and wherein the features are one or more signals in a time domain, a frequency domain, or both the time and frequency domains characteristic of keywords one or more neural networks are trained to recognize.

6. A method of conditional neural network operation in a sensor-processing system upon detection of a credible signal, comprising:

operating a pulse-density modulation ("PDM") microphone, a PDM decimation module, a time domain-processing module, and a frequency domain-processing module, operating the PDM microphone in a first mode to conserve power, and wherein the PDM decimation module decimates an audio sample from the PDM microphone to a baseband audio sampling rate;

wherein operating the time domain-processing module and the frequency domain-processing module includes identifying one or more signals of the audio sample in a time domain or a frequency domain if the one or more signals of the audio sample are present;

wherein the time domain-processing module is configured to process amplitudes of signals in the audio samples multiplexed by a mux module;

temporarily storing extracted features in a feature store for subsequent analysis;

determining whether the signal represents speech in the frequency domain of the audio sample;

operating a smaller, secondary neural network to determine if the one or more signals includes a portion of a keyword and to identify an assigned speaker;

configuring a sample holding tank to temporarily store audio samples formatted for processing;

operating the PDM microphone in a second mode to achieve a desired signal-to-noise ratio for a subsequent audio sample in response to determining that the one or more signals are present in the time domain;

determining whether the one or more signals represents speech in the frequency domain of the audio sample;

determining whether the speech includes features which are characteristic of the assigned speaker based on further analysis of the audio samples in the sample holding tank;

and, in response to determining that the signal represents speech and the speech includes features which are characteristic of the assigned speaker, powering on and operating a larger, primary neural network to confirm if the one or more signals includes the keyword or a portion thereof.

7. The method of claim 6, further comprising:

pulling the audio sample from the sample holding tank to either:

confirm the one or more signals includes a keyword; or process the audio sample via an alternative method.

8. A method of conditional neural network operation in a sensor-processing system upon detection of a credible keyword, comprising:

operating a pulse-density modulation ("PDM") microphone, a PDM decimation module, a time domain-processing module, and a frequency domain-processing module, operating the PDM microphone in a first mode to conserve power, and wherein the PDM decimation module decimates an audio sample from the PDM microphone to a baseband audio sampling rate;

wherein operating the time domain-processing module and the frequency domain-processing module includes identifying one or more signals of the audio sample in a time domain or a frequency domain if the one or more signals of the audio sample are present;

wherein the time domain-processing module is configured to process amplitudes of signals in the audio samples multiplexed by a mux module;

temporarily storing extracted features in a feature store for subsequent analysis by a neural network;

wherein in response to determining that a signal is present in the time domain of the audio sample, determining whether the signal represents speech in the frequency domain of the audio sample;

operating a low-powered secondary neural network in response to determining that the one or more signals represent speech in the frequency domain, to determine if the one or more signals includes a keyword;

configuring a sample holding tank to temporarily store audio samples formatted for processing without real-time re-acquisition of the audio samples;

operating the PDM microphone in a second mode to achieve a desired signal-to-noise ratio for a subsequent audio sample in response to determining that a signal is present in the time domain;

operating the low-powered secondary neural network to perform further analysis of the audio samples in the sample holding tank, the further analysis for determining whether the speech includes features which are characteristic of an assigned speaker;

and powering on and operating a high-powered primary neural network if both the one or more signals include a keyword or a portion of the keyword and the speech including features which are characteristic of an assigned speaker, wherein the primary neural network confirms the one or more signals include a keyword or a portion of the keyword.

9. The method of claim 8, further comprising:

pulling the audio sample from the sample holding tank to either:

confirm the one or more signals includes a keyword; or process the audio sample via an alternative method.

* * * * *